(12) United States Patent
Tobe et al.

(10) Patent No.: US 6,481,743 B1
(45) Date of Patent: Nov. 19, 2002

(54) SIDE CURTAIN AIR BAG

(75) Inventors: Jennifer M Tobe, Tipp City, OH (US); Connie M. Hardig, Cincinnati, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/872,568

(22) Filed: Jun. 1, 2001

(51) Int. Cl.⁷ .............................................. B60R 21/22
(52) U.S. Cl. .................................. 280/728.2; 280/730.2
(58) Field of Search ...................... 280/728.2, 730.2, 280/730.1, 729, 743.1

(56) References Cited

U.S. PATENT DOCUMENTS

| | | | |
|---|---|---|---|
| 4,966,388 A | * 10/1990 | Warner et al. | 280/730.1 |
| 5,265,903 A | * 11/1993 | Kuretake et al. | 280/730.2 |
| 5,333,899 A | * 8/1994 | Witte | 280/728.1 |
| 5,556,128 A | * 9/1996 | Sinnhuber et al. | 280/730.2 |
| 5,647,609 A | * 7/1997 | Spencer et al. | 280/730.1 |
| 5,803,485 A | * 9/1998 | Acker et al. | 280/728.2 |
| 5,806,881 A | * 9/1998 | Richter et al. | 280/730.2 |
| 5,913,536 A | * 6/1999 | Brown | 280/728.2 |
| 6,095,551 A | 8/2000 | O'Docherty | 280/730.2 |
| 6,123,355 A | * 9/2000 | Sutherland | 280/728.2 |
| 6,152,481 A | 11/2000 | Webber et al. | 280/730.2 |
| 6,158,767 A | * 12/2000 | Sinnhuber | 280/730.2 |
| 6,168,191 B1 | 1/2001 | Webber et al. | 280/730.2 |
| 6,170,860 B1 | * 1/2001 | Denz et al. | 280/729 |
| 6,224,091 B1 | * 5/2001 | Eyrainer et al. | 280/730.2 |
| 6,237,937 B1 | * 5/2001 | Kokeguchi et al. | 280/730.2 |
| 6,237,941 B1 | * 5/2001 | Bailey et al. | 280/729 |
| 6,244,619 B1 | * 6/2001 | Satzger | 280/730.2 |
| 6,338,498 B1 | * 1/2002 | Niederman et al. | 280/728.2 |

FOREIGN PATENT DOCUMENTS

| | | | | |
|---|---|---|---|---|
| JP | 405038993 | * | 2/1993 | 280/730.2 |
| JP | 405238347 | * | 9/1993 | 280/730.2 |

* cited by examiner

*Primary Examiner*—Paul N. Dickson
*Assistant Examiner*—Toan To
(74) *Attorney, Agent, or Firm*—Kathryn A. Marra

(57) ABSTRACT

An air bag cushion deployable from a location along the roof rail the vehicle interior over an expansive area adjacent to an occupant to be protected. The air bag cushion is of a partially segmented construction including a main body portion deployable downwardly away from the roof rail and an expansible upper portion expansible between the header portion of the roof rail and the head of an adjacently seated vehicle occupant. The main body portion and the inflatable upper portion of the air bag cushion are attachable to the roof rail structure along a common line of attachment. The inflatable upper portion and the main body portion of the air bag cushion may be inflated by a common source of inflation gas so as to utilize a single common inflator.

17 Claims, 4 Drawing Sheets

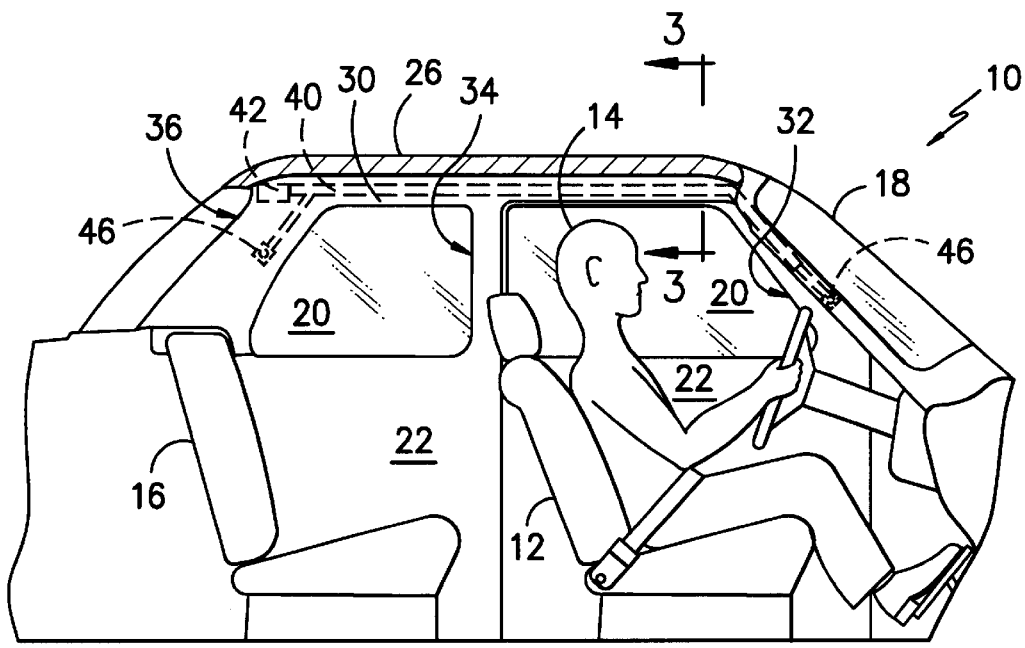
FIG. -1-
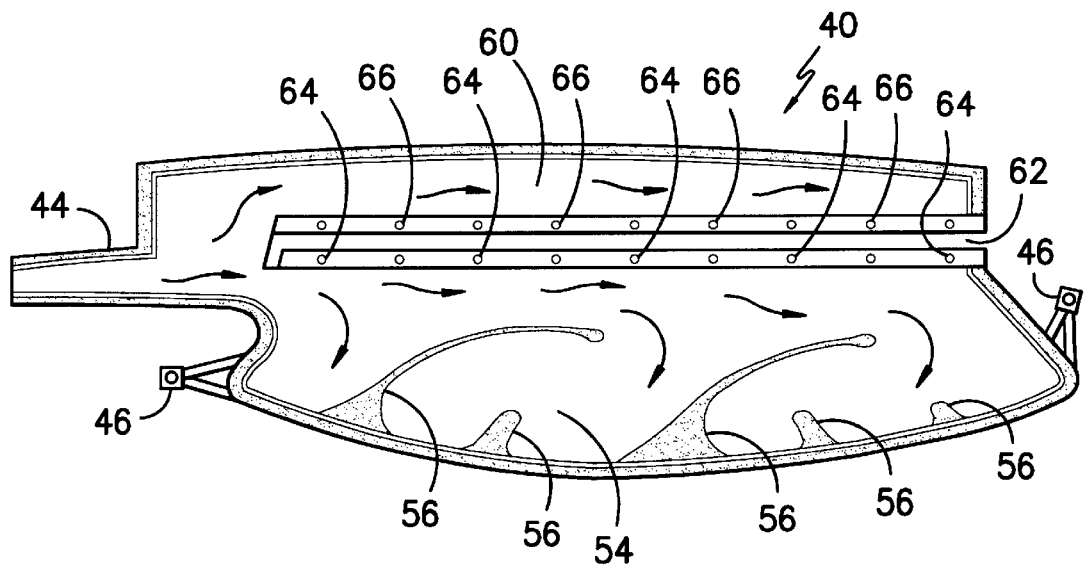
FIG. -2-

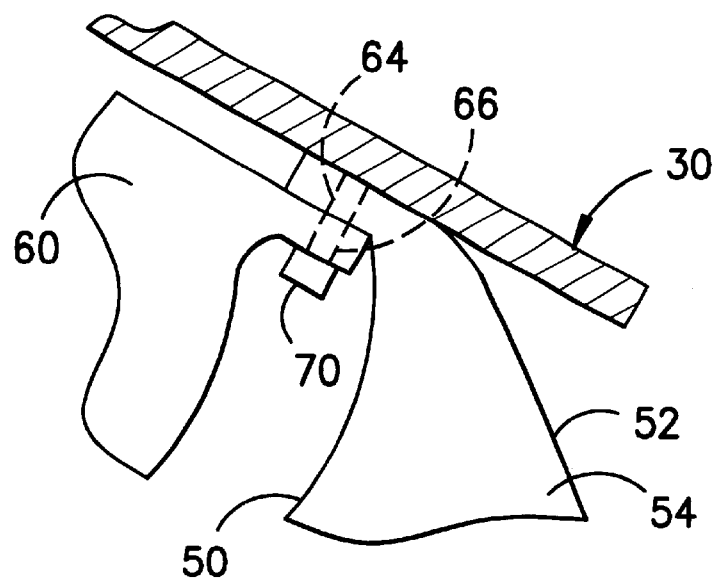
FIG. -3-
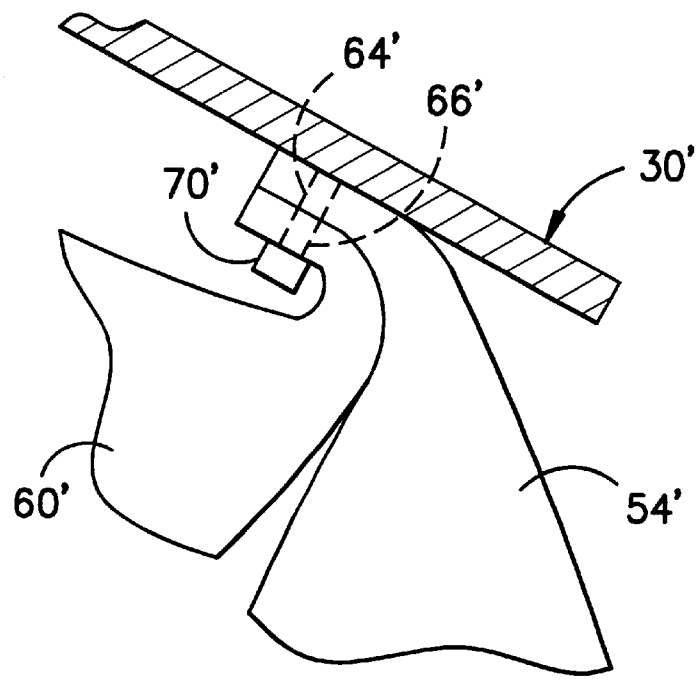
FIG. -3A-

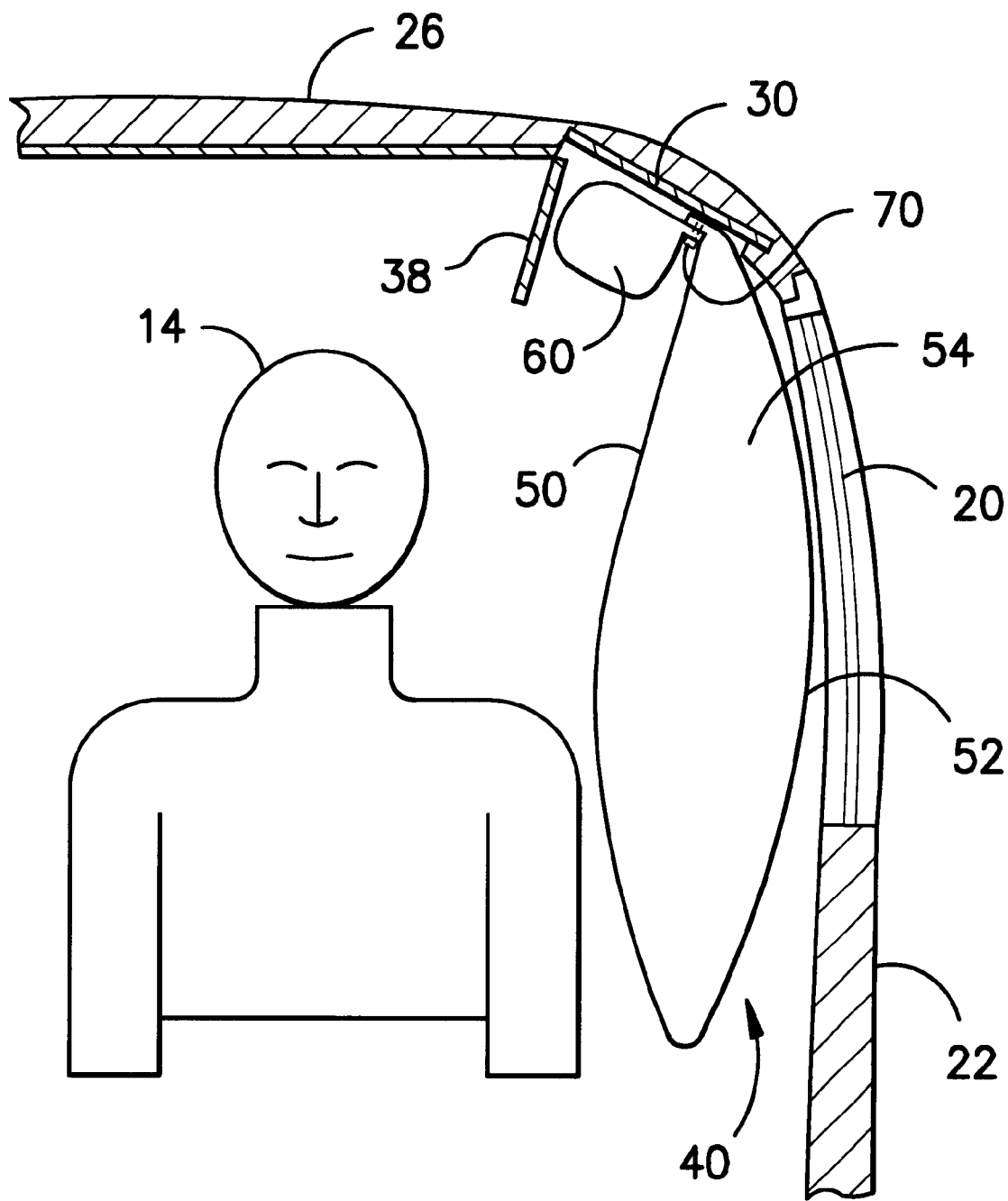
FIG. -4-

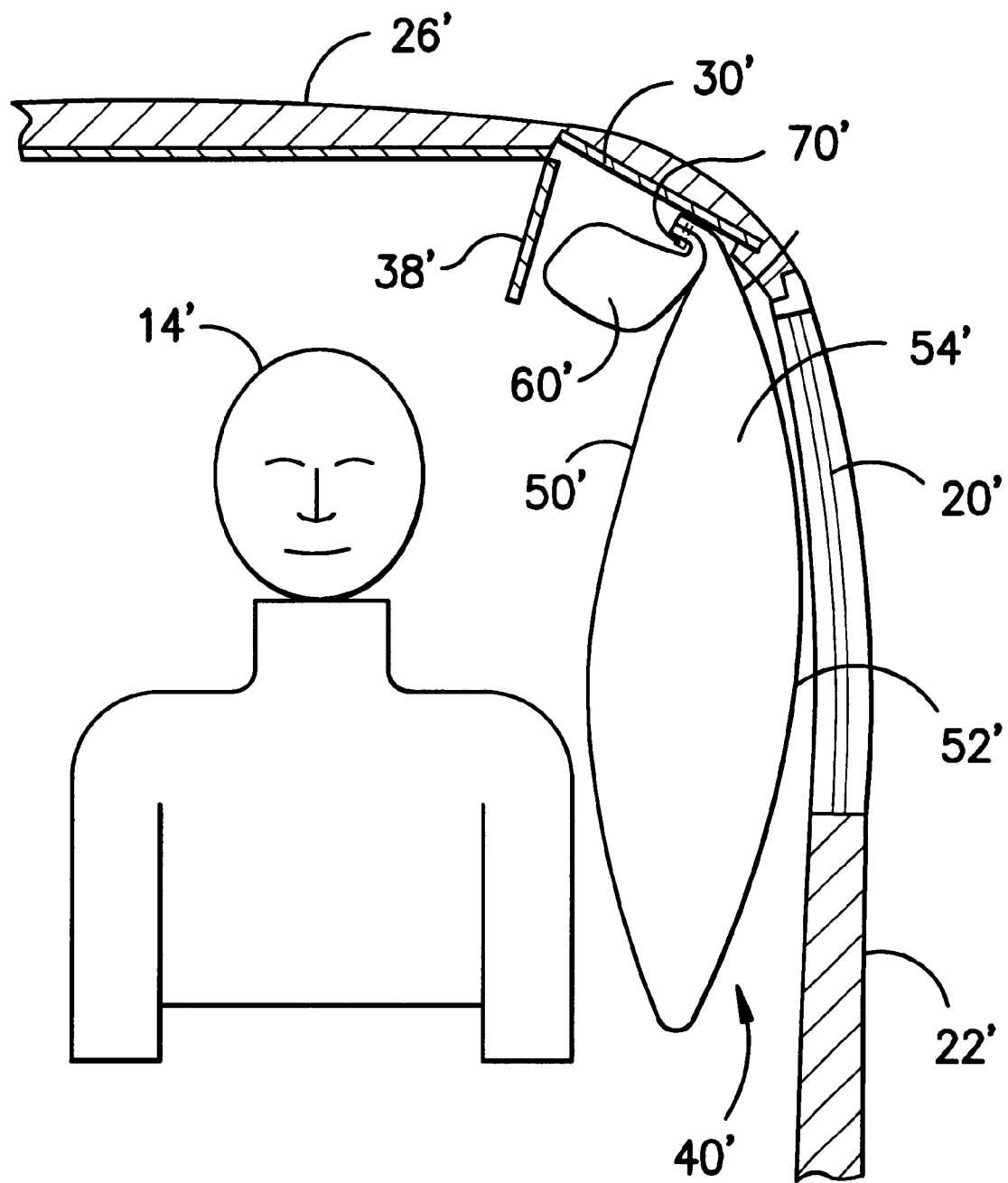
FIG. —4A—

SIDE CURTAIN AIR BAG

TECHNICAL FIELD

The present invention relates to an inflatable air bag cushion for use in covering a side portion of a vehicle interior adjacent to an occupant to be protected during a collision event, and more particularly, to an air bag cushion of substantially curtain-like structure for deployment away from the roof rail of the vehicle. The air bag cushion includes a main body portion for deployment generally downwardly and away from the vehicle roof rail to the side of an occupant to be protected and an inflatable upper portion for expansion between the head of the occupant to be protected and opposing portions of the roof rail structure.

BACKGROUND OF THE INVENTION

It is well known in motor vehicles to provide air bag cushions for protecting a vehicle occupant. Such air bag cushions are typically in fluid communication with gas generating inflators so as to inflate the cushions upon sensing predetermined vehicle conditions such as decelerations exceeding a certain level. It is further known to provide air bag systems including inflatable restraint cushions which are deployed from positions of attachment to the vehicle frame along the roof rail portion of the vehicle frame so as to extend downwardly in substantially curtain-like fashion between an occupant to be protected and the side portion adjacent to such occupant. Such coverage is intended to provide cushioning restraint for the occupant during a side impact or extended roll-over collision event. Such curtain-like structures thereby provide protection to the vehicle occupant generally in regions below the location of attachment along the roof rail of the vehicle. That is, the protection afforded by such downwardly deployed curtain-like structures extends substantially in the region below the zone of attachment along the roof rail.

In some instances such as during an extended roll-over event, it is contemplated that an occupant may come into contact with the upper portions of the roof rail structure commonly referred to as the "header" portion of the roof rail. Typically, such contact will be between the head of the vehicle occupant and the header portion of the roof rail which is generally undesirable.

SUMMARY OF THE INVENTION

This invention provides advantages and alternatives over the prior art by providing an air bag cushion which is deployed from a location along the roof rail portion of a vehicle frame in substantially curtain-like fashion across the side of the vehicle interior over an expansive area adjacent to an occupant to be protected. The air bag cushion further includes an expansible upper portion expansible between the header portion of the roof rail and the head of an adjacently seated vehicle occupant. The main body portion and the inflatable upper portion of the air bag cushion are attachable to the roof rail structure along a common line of attachment. The inflatable upper portion and the main body portion of the air bag cushion may be inflated by a common source of inflation gas so as to utilize a single common inflator.

According to one potentially preferred aspect of the invention, the air bag cushion incorporates a substantially segmented construction along at least a portion of its length such that the inflatable upper portion and the main body portion are separated from one another except for a common inflation path adjacent a gas inlet opening to the air bag cushion. The segmented construction of the air bag cushion facilitates potentially desirable attachment arrangements between the air bag cushion and the roof rail so as to promote desired deployment characteristics for the inflatable upper portion which are substantially independent from the inflation and deployment of the main body portion.

According to another potentially preferred aspect of the present invention, deployment of the inflatable upper portion of the air bag cushion is not dependent upon inflation of the main body portion since inflation gas is not required to travel substantially through the main body portion before reaching the inflatable upper portion of the air bag cushion. The present invention thus provides a highly efficient and versatile structure for providing cushioning protection to a vehicle occupant and thus provides useful advantages over the prior art.

BRIEF DESCRIPTION OF THE DRAWINGS

A full and enabling disclosure of the present invention is set forth more particularly in the remainder of the specification, including reference to the accompanying figures in which:

FIG. 1 is a cut-away view of the interior of an automotive vehicle incorporating a curtain-like air bag cushion according to the present invention mounted along the roof rail portion of the vehicle frame generally to the side of and above an occupant to be protected;

FIG. 2 illustrates one embodiment of a curtain-like air bag cushion according to the present invention;

FIG. 3 is a representative view of an attachment arrangement between the air bag cushion illustrated in FIG. 2 and the roof rail portion of the vehicle frame;

FIG. 3A is a representative view of an attachment arrangement between the air bag cushion illustrated in FIG. 2 and the roof rail portion of the vehicle frame;

FIG. 4 is a representative view of the deployment of a curtain-like air bag cushion according to the present invention mounted using the attachment arrangement illustrated in FIG. 3; and FIG. 4A is a representative view of the deployment of a curtain-like air bag cushion mounted incorporating the attachment arrangement illustrated in FIG. 3A.

While the invention has been illustrated and generally described above and will hereinafter be described in connection with certain potentially preferred embodiments, constructions and practices, it is to be understood that in no event is the invention to be limited to such illustrated and described embodiments, constructions or practices. On the contrary, it is intended that the present invention shall extend to all alternatives and modifications as may embrace the broad principles of this invention within the true spirit and scope thereof.

DESCRIPTION OF THE PREFERRED EMBODIMENT

Turning now to the drawings wherein like reference numerals have been utilized to designate like components throughout the various views, in FIG. 1, there is illustrated a vehicle 10 such as an automobile as will be well known to those of skill in the art. It is to be appreciated that while the invention will hereinafter be described in reference to operation within an automobile, it is contemplated that the invention is likewise applicable to any number of other transportation vehicles including by way of example only, aircraft, buses and railroad cars. In the illustrated environment of use, the vehicle 10 includes a front seat 12 which may be used to support a front seated vehicle occupant 14. The vehicle 10 may further include a rear seat 16 which may be used to support a rear occupant (not shown). While the front seat 12 and the rear seat 16 are illustrated as being located on the driver's side of the vehicle 10, it is to be appreciated that the present invention is also useful in the protection of an occupant (not shown) seated in either the front seat or rear seat on the passenger side of the vehicle 10.

In order to provide visibility to the occupant 14, the vehicle 10 is provided with a windshield 18 as well as with one or more side windows 20. As illustrated, the side windows 20 are located generally adjacent to the seats 12, 16 to the sides of the occupants seated therein. The vehicle 10 preferably also includes one or more doors 22 which extend adjacent to the seats 12, 16 towards a roof 26.

As will be appreciated by those of skill in the art, the vehicle 10 preferably includes a structural frame formed from an arrangement of structural support members including a roof rail 30 disposed generally at the intersection between the doors 22 and the roof 26. The vehicle 10 also preferably includes a series of structural support members 32, 34, 36 which extend downwardly from the roof rail 30. The structural support pillar 32 which extends between the windshield 18 and the side window 20 adjacent to the front seat 12 is commonly referred to as the "A" pillar. The structural support pillar 34 disposed intermediate the side windows 20 is commonly referred to as the "B" pillar. The structural support pillar 36 disposed rearward of the side window 20 adjacent to the rear seat 16 is commonly referred to as the "C" pillar. As will be appreciated, each of the structural support pillars 32, 34, 36 is preferably covered by a trim piece which extends in elongate fashion away from the roof rail 30. The roof rail 30 is likewise preferably covered by a trim piece or headlining material 38 as shown in FIG. 4 so as to permit the egress of an air bag cushion in the manner as described hereinafter.

As illustrated in FIG. 1, it is contemplated that an air bag cushion in the form of an inflatable curtain structure 40 may be stored in rolled or folded fashion in attached relation to the vehicle frame along at least a portion of the roof rail 30. It is also contemplated that portions of the inflatable curtain structure may be stored along portions of the "A" pillar 32 and/or along portions of the "C" pillar 36. As shown, the inflatable curtain structure 40 is preferably in fluid communication with a gas discharging inflator 42. As is well known to those of skill in the art such that gas may be discharged from the inflator 42 and into an inlet opening 44 (FIG. 2) to effect deployment of the inflatable curtain structure 40. As illustrated, the inflatable curtain structure 40 may also be attached to tethering elements 46 secured at locations to promote the desired deployment path for the inflatable curtain structure upon inflation by the inflator 42. As will be appreciated, the inflatable curtain structure 40, inflator 42, and tethering elements are preferably hidden from view by the overlying trim.

It is to be understood that while the inflatable curtain structure 40 is illustrated as being attached substantially between the "A" pillar 32 and the "C" pillar 36, storage may in fact take place over either a longer or a shorter region if desired. By way of example only, in the event that the vehicle 10 incorporates only a front seat 12, the inflatable curtain structure 40 may be attached between the "A" pillar 32 and the "B" pillar 34. Likewise, in the event that the vehicle 10 incorporates additional rows of seats (not shown), the inflatable curtain structure may be attached between opposing pillar elements at either end of the vehicle 10. Moreover, while the vehicle 10 is illustrated as incorporating only a single inflatable curtain structure 40 for coverage of the region adjacent to the seats 12, 16 it is likewise contemplated that two or more such curtain structures 40 may be utilized if desired to cooperatively cover portions of the vehicle interior.

Referring now to FIG. 2, an inflatable curtain structure 40 according to the present invention is illustrated. As previously indicated, the inflatable curtain structure 40 preferably includes a gas inlet opening 44 in fluid communication with the inflator 42 so as to permit the introduction of a gaseous inflation medium into the inflatable curtain structure 40 upon the occurrence of predetermined vehicle conditions such as rapid deceleration or angular tilt exceeding certain levels. According to the potentially preferred practice of the present invention, the inflatable curtain structure is formed by adjoining panels of substantially pliable material in a pattern so as to form a substantially gas tight enclosure to contain the inflation gas exiting the inflator 42 during an extended roll-over event.

As best illustrated through reference to FIG. 4, it is contemplated that the inflatable curtain structure 40 preferably includes a front impact surface 50 which faces towards the occupant 14 to be protected during a collision event and a rear surface 52 which faces generally away from the occupant to be protected during the collision event and toward the adjacent side window 20. The front impact surface 50 and the rear surface 52 bound a gas containment chamber within the main body portion 54 of the inflatable curtain structure 40. In addition, as best illustrated in FIG. 2, it is contemplated that the inflatable curtain structure 40 may include a pattern of regions of substantially non inflatable character 56 formed by joining together the front impact surface 50 and the rear surface 52 in areas where inflation is not desired thereby precluding expansion of the cushion in those regions and reducing the total volume of inflating gas necessary to achieve complete inflation.

The materials forming the inflatable curtain structure 40 are preferably of a substantially pliable character so as to permit the inflatable curtain structure 40 to be rolled or folded into a compact space beneath the trim 38 covering the roof rail 30. Textile fabrics may be preferred. Woven or knitted fabrics of nylon or polyester may be particularly preferred. It is contemplated that the air bag cushion 40 may be formed from two or more substantially discrete panels of material which are thereafter seamed together or may be formed as a substantially unitary structure if desired. That is, since the air bag cushion 40 according to the present invention is of a relatively simple substantially two-dimensional configuration incorporating two opposing layers of material, it is possible to form the cushion using either traditional cutting and sewing techniques or by using patterned weaving or knitting techniques to form the air bag cushion 40 directly on the weaving loom or other formation apparatus simultaneous with the construction of the fabric or other material from which the air bag cushion is made. The ability to utilize such on loom formation may be beneficial in reducing processing steps and labor needed to form the air bag cushion 40. Moreover, as explained further hereinafter, despite a relatively simple construction, the air bag cushion 40 is nonetheless capable of providing substantial coverage over a relatively complex geometric surface both above and below its position of attachment to the vehicle 10.

In order to retain the inflating gas during an extended roll-over event, it is contemplated that the materials forming the inflatable curtain structure 40 are preferably substantially impermeable to the inflation gas. In this regard it is contemplated that such low gas permeability may be achieved by providing a permeability blocking coating in the form of a film or dispersion of suitable material such as silicone, polyurethane, polyamides, acrylics and mixtures thereof across the inflatable portions of the front impact surface 50 and the rear surface 52.

As indicated, according to the illustrated and potentially preferred embodiment, the inflatable curtain structure 40 includes the inflatable main body portion 54 defining the gas containment chamber bounded between the front impact surface 50 and the rear surface 52. As illustrated in FIG. 4, upon deployment, the main body portion 54 is deployed generally downwardly away from the roof rail 30. As illustrated in FIG. 2, the inflatable curtain structure 40 also includes an inflatable upper portion 60. The main body portion 54 is preferably separated from the inflatable upper portion 60 by a zone of separation 62 such as a gap extending along a portion of the length of the inflatable curtain structure 40. As illustrated, the separation between the main body portion 54 and the inflatable upper portion 60 is preferably terminated at a location adjacent the inlet opening 44 such that both the main body portion 54 and the upper portion are in common fluid communication with the inlet opening 44. Such common fluid communication facilitates the use of a single inflator 42 to inflate both the main body portion 54 and the inflatable upper portion 60. However, inflation gas need not travel through the main body portion 54 in order to reach the upper portion 60. Of course, it is to be appreciated that the main body portion 54 and the inflatable upper portion 60 may be separated by means other than a gap such as by a web structure or the like if desired.

As previously indicated, the inflatable curtain structure 40 is preferably attached to the frame of the vehicle 10 along a portion of the roof rail 30. Referring simultaneously to FIGS. 2 and 3, according to one potential embodiment, the inflatable curtain structure 40 is provided with a first series of fastening apertures 64 arranged along the upper edge of the main body portion 54 adjacent the zone of separation 62 between the main body portion 54 and the inflatable upper portion 60. A second series of corresponding fastening apertures 66 is preferably arranged along the lower edge of the inflatable upper portion 60 in substantially direct alignment with the first series thereby providing a dual set of fastening apertures 64, 66. The incorporation of such a dual set of fastening apertures 64, 66 facilitates the mounting of the inflatable curtain structure 40 to the roof rail 30 so as to provide the ability to control the deployment orientation of the inflatable upper portion 60 without altering the deployment characteristics of the main body portion 54.

As shown in FIG. 3, according to a first mounting arrangement, the inflatable upper portion 60 may be pulled towards the main body portion to effect substantial alignment between the fastening apertures 64, 66. This alignment permits the insertion of a common fastening element 70 such as a screw or snap fastener through each aligned pair of fastening apertures 64, 66 for attachment to the roof rail 30. Of course a plurality of such fastening elements 70 extending through corresponding pairs of fastening apertures 64, 66 is arranged along the attachment zone. As best illustrated in FIG. 4, the attachment arrangement utilized in FIG. 3 promotes the generally upward deployment of the inflatable upper portion 60 along the header portion of the roof rail 30.

An alternative fastening arrangement is illustrated in FIG. 3A. As shown, in this arrangement, the inflatable upper portion 60 is folded in substantially flap-like fashion in juxtaposed relation to the main body portion 54. This folding operation is carried out so as to substantially align the corresponding fastening apertures 64, 66 of the main body portion 54 and inflatable upper portion 60 respectively. Such alignment permits the insertion of a single fastening element 70 for connection to the roof rail 30. The resultant deployment characteristics of the attachment arrangement illustrated in FIG. 3A are illustrated in FIG. 4A. As shown, the attachment arrangement of FIG. 3A causes the inflatable upper portion 60 to be biased outwardly in a more lateral position which may provide added cushioning in the region immediately opposing the position of attachment to the roof rail 30. Such performance characteristics may be desirable in some instances depending upon the actual configuration of the roof rail 30. Such versatility facilitates the use of common inflatable curtain structure designs over a broad range of vehicle types.

As illustrated in FIGS. 4 and 4A it is contemplated that the inflatable upper portion 60 of the inflatable curtain structure 40 may be arranged in stored relation along the roof rail 30 behind a covering layer of headlining material 38 such that it deploys from a position generally behind the headlining material 38. As illustrated, such an arrangement forces the headlining material 38 away from the roof rail 30 during deployment. It is likewise contemplated that the inflatable upper portion 60 may be deployed in front of the headlining material 38 if desired. By way of example only, and not limitation, such deployment characteristics may be realized by storing the inflatable curtain structure 40 behind a roof rail trim element (not shown) which hinges downwardly and outwardly (i.e. towards the windows 20) as it is forced away from the roof rail 30 by the deploying inflatable curtain structure 40. Such a configuration has the benefit of allowing the headlining material 38 to remain substantially intact during the deployment event which may provide additional coverage over the header portion of the roof rail 30.

It is to be understood that while the present invention has been illustrated and described in relation to certain potentially preferred embodiments, constructions and procedures, that such embodiments, constructions and procedures are intended to be illustrative only and that the present invention is in no event to be limited thereto. Rather, it is contemplated that modification and variations embodying the principles of this invention will no doubt occur to those of skill in the art. It is thus contemplated and intended that the present invention shall extend to all such modifications and variations as may incorporate the broad aspects of the invention within the full spirit and scope of the appended claims and all equivalents thereto.

What is claimed is:

1. An inflatable curtain structure for deployment within the interior of a transportation vehicle including a roof and a structural roof rail so as to cover an area below the roof adjacent to an occupant within the vehicle upon the occurrence of an activating event, the curtain structure comprising:

a gas inlet for acceptance of inflation gas;

a main body portion of inflatable character including an impact surface facing generally towards the occupant upon inflation of the curtain structure and a rear surface facing generally away from the occupant upon inflation of the curtain structure;

an inflatable upper portion of substantially extended elongate configuration disposed above the main body portion and extending substantially adjacent to the roof rail such that upon inflation the upper portion extends along a portion of the length of the vehicle in covering relation to a portion of the roof rail; and a fluid blocking zone of separation extending between the main body portion and the upper portion along at least a portion of the length of the curtain structure, the main body portion and the upper portion each being in fluid communication with the gas inlet such that the main body portion and the upper portion are inflatable substantially independently from one another upon the occurrence of the activating event substantially without reliance upon transmission of inflation gas between the main body portion and the upper portion.

2. The invention according to claim 1, wherein the zone of separation comprises a gap extending between the main body portion and the upper portion.

3. The invention according to claim 1, wherein the zone of separation comprises a web structure extending between the main body portion and the upper portion.

4. The invention according to claim 1, wherein the zone of separation extends from a lateral edge of the inflatable curtain structure to a location at the interior of the inflatable curtain structure.

5. The invention according to claim 4, wherein the distance between the gas inlet and said location at the interior of the inflatable curtain structure is less than the distance between the gas inlet and said lateral edge.

6. An inflatable curtain structure for deployment within the interior of a transportation vehicle including a roof and a structural roof rail so as to cover an area below the roof adjacent to an occupant within the vehicle upon the occurrence of an activating event, the curtain structure comprising:

a gas inlet for acceptance of inflation gas;

a main body portion of inflatable character including an impact surface facing generally towards the occupant upon inflation of the curtain structure and a rear surface facing generally away from the occupant upon inflation of the curtain structure; an inflatable upper portion of substantially extended elongate configuration disposed above the main body portion and extending substantially adjacent to the roof rail such that upon inflation the upper portion extends along a portion of the length of the vehicle in covering relation to a portion of the roof rail; and a fluid blocking zone of separation extending between an upper edge of the main body portion and a lower edge of the upper portion along at least a portion of the length of the curtain structure, the main body portion and the upper portion each being in fluid communication with the gas inlet such that the main body portion and the upper portion are inflatable substantially independently from one another upon the occurrence of the activating event substantially without reliance upon transmission of inflation gas between the main body portion and the upper portion a first arrangement of attachment structures disposed substantially adjacent the upper edge of the main body portion for attachment of the main body portion to the roof rail; and a second arrangement of attachment structures disposed substantially adjacent the lower edge of the upper portion for attachment of the upper portion to the roof rail.

7. The invention according to claim 6, wherein the zone of separation comprises a gap extending between the main body portion and the upper portion.

8. The invention according to claim 6, wherein the zone of separation comprises a web structure extending between the main body portion and the upper portion.

9. The invention according to claim 6, wherein the zone of separation extends from a lateral edge of the inflatable curtain structure to a location at the interior of the inflatable curtain structure.

10. The invention according to claim 9, wherein the distance between the gas inlet and said location at the interior of the inflatable curtain structure is less than the distance between the gas inlet and said lateral edge.

11. The invention according to claim 6, wherein the first arrangement of attachment structures comprises a plurality of apertures arranged in a pattern for acceptance of fastening elements attachable to the roof rail (30).

12. The invention according to claim 6, wherein the second arrangement of attachment structures comprises a plurality of apertures arranged in a pattern for acceptance of fastening elements attachable to the roof rail.

13. The invention according to claim 6, wherein the first arrangement of attachment structures and the second arrangement of attachment structures each comprise a plurality of apertures for acceptance of fastening elements attachable to the roof rail.

14. The invention according to claim 13, wherein the apertures comprising the first arrangement of attachment structures and the apertures comprising the second arrangement of attachment structures are disposed in substantial alignment across the zone of separation such that apertures within the second arrangement of attachment structures are alignable in overlapping registry with corresponding apertures within the first arrangement of attachment structures for acceptance of common fastening elements attachable to the roof rail.

15. A restraint system for protection of an occupant at the interior of a transportation vehicle including a roof and a structural roof rail, comprising:

a gas emitting inflator and an inflatable curtain structure for storage along and deployment away from the roof rail so as to cover at least a portion of the roof rail and an area below the roof rail adjacent to the occupant within the vehicle upon the occurrence of an activating event, the curtain structure comprising:

a gas inlet for acceptance of inflation gas from the inflator;

a main body portion of inflatable character including an impact surface facing generally towards the occupant upon inflation of the curtain structure and a rear surface facing generally away from the occupant upon inflation of the curtain structure;

an inflatable upper portion of substantially extended elongate configuration disposed above the main body portion and extending substantially adjacent to the roof rail such that upon inflation the upper portion extends along a portion of the length of the vehicle in covering relation between the occupant and a portion of the roof rail; and a fluid blocking zone of separation extending between an upper edge of the main body portion and a lower edge of the upper portion along at least a portion of the length of the curtain structure, the main body portion and the upper portion each being in fluid communication with the gas inlet such that the main body portion and the upper portion are inflatable substantially independently from one another upon the occurrence of the activating event substantially without reliance upon transmission of inflation gas between the main body portion and the upper portion a first arrangement of attachment apertures disposed substantially adjacent the upper edge of the main body portion for attachment of the main body portion to the roof rail; and a second arrangement of attachment apertures disposed substantially adjacent the lower edge of the upper portion for attachment of the upper portion to the roof rail, wherein the first and second arrangements of attachment apertures are disposed in substantial alignment with one another across the zone of separation; and wherein at least a portion of the apertures within the second arrangement of attachment apertures are aligned in juxtaposed registry with corresponding apertures within the first arrangement of attachment structures to establish one or more passageways for acceptance of common fastening elements extending across both the main body portion and the upper portion for attachment to the roof rail.

16. The invention according to claim 15, wherein the upper portion is disposed in substantially folded over relation to the main body portion.

17. The invention according o claim 15, wherein the upper portion and the main body portion are arranged in a pleated orientation.

* * * * *